(12) United States Patent
Ouderkirk et al.

(10) Patent No.: US 10,569,486 B2
(45) Date of Patent: Feb. 25, 2020

(54) LOW BIREFRINGENCE, MOLDED OPTICAL COMPONENTS

(71) Applicant: 3M INNOVATIVE PROPERTIES COMPANY, St. Paul, MN (US)

(72) Inventors: Andrew J. Ouderkirk, St. Paul, MN (US); Timothy L. Wong, St. Paul, MN (US); Erin A. McDowell, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 260 days.

(21) Appl. No.: 15/037,758

(22) PCT Filed: Nov. 26, 2014

(86) PCT No.: PCT/US2014/067668
§ 371 (c)(1),
(2) Date: May 19, 2016

(87) PCT Pub. No.: WO2015/084674
PCT Pub. Date: Jun. 11, 2015

(65) Prior Publication Data
US 2016/0297154 A1 Oct. 13, 2016

Related U.S. Application Data

(60) Provisional application No. 61/911,145, filed on Dec. 3, 2013.

(51) Int. Cl.
*B29D 11/00* (2006.01)
*B29C 45/00* (2006.01)
(Continued)

(52) U.S. Cl.
CPC ...... *B29D 11/0073* (2013.01); *B29C 45/0055* (2013.01); *B29D 11/00* (2013.01);
(Continued)

(58) Field of Classification Search
CPC ............... B29D 11/0073; B29D 11/00; B29D 11/00009; B29D 11/00932;
(Continued)

(56) References Cited

U.S. PATENT DOCUMENTS 6,324,010 B1 * 11/2001 Bowen ............. B29D 11/00278
264/1.1
6,956,995 B1 * 10/2005 Shafaat .................... G02B 6/32
385/33

(Continued)

FOREIGN PATENT DOCUMENTS

JP 2004-341047 12/2004
WO WO 2006/050230 5/2006

OTHER PUBLICATIONS

Lovell Comstock, Recent Technology Advances in Diamond Machining for Space Borne Optical Systems, Mar. 1, 2005, Corning NetOptix (Year: 2005).*

(Continued)

*Primary Examiner* — William P Bell
*Assistant Examiner* — Andrew L Swanson
(74) *Attorney, Agent, or Firm* — Robert S. Moshrefzadeh (57) ABSTRACT

In some examples, a method may include injection molding an optical material in a mold defining at least one optical surface to form a molded component, and machining the molded component to form a machined optical component including a machined optical surface. In some examples, a method may include injection molding an optical material in an axially symmetric mold cavity defining at least one optical surface to form a molded component, and machining the molded component to form an optical component that does not possess axial symmetry. Optical component formed by these methods and molds for utilizing in these methods also are described.

17 Claims, 6 Drawing Sheets

(51) Int. Cl.
*G02B 5/04* (2006.01)
*G02B 1/04* (2006.01)

(52) U.S. Cl.
CPC .. *B29D 11/00009* (2013.01); *B29D 11/00932* (2013.01); *G02B 1/04* (2013.01); *G02B 5/04* (2013.01); *B29C 2045/0058* (2013.01); *B29C 2045/0079* (2013.01)

(58) Field of Classification Search
CPC ......... B29D 11/0074–00759; B29D 11/00721; B29D 11/00942; B29C 45/0055; B29C 2045/0058; B29C 2045/0079; G02B 1/04; G02B 5/04
See application file for complete search history.

(56) References Cited

U.S. PATENT DOCUMENTS

| | | | |
|---|---|---|---|
| 2001/0035935 A1* | 11/2001 | Bhalakia | B29D 11/00028 351/159.62 |
| 2002/0030900 A1 | 3/2002 | Tominaga | |
| 2006/0024491 A1* | 2/2006 | Graney | B32B 7/005 428/323 |
| 2007/0229756 A1* | 10/2007 | Mandler | B24B 13/005 351/159.74 |
| 2009/0183819 A1 | 7/2009 | Matsuhira | |
| 2012/0038072 A1 | 2/2012 | Huang | |
| 2012/0154883 A1 | 6/2012 | Cho | |
| 2014/0054805 A1* | 2/2014 | Meyers | B29C 39/12 264/1.31 |
| 2014/0104706 A1* | 4/2014 | Takeuchi | B23K 26/0648 359/726 |

OTHER PUBLICATIONS

PCT International Search Report from PCT/US2014/067668, dated Feb. 23, 2015, 3 pages.

* cited by examiner

LOW BIREFRINGENCE, MOLDED OPTICAL COMPONENTS

TECHNICAL FIELD

The disclosure describes optical components and techniques for forming optical components.

BACKGROUND

Molded optical components such as lenses and prisms are becoming increasingly popular for use in devices such as cell phone cameras, compact digital cameras, digital video projectors, etc. Molding allows high volume production and geometries that are difficult to achieve using traditional methods for producing glass optics.

SUMMARY

In general, the disclosure describes optical components, molds for forming optical components, and techniques for forming optical components. In some examples, the optical components may be formed using injection molding, and the mold may define a mold cavity with a shape selected to reduce molding stresses imparted on the molded material during the molding process. For example, rather than the mold defining a cavity including acute angles, sudden changes in shape or cross-sectional area, or asymmetric cross-sectional shapes, the mold may define a cavity with a relatively simple shape, such as a rectangular cuboid or a cylinder. By reducing a number of acute angles in the molded component, sudden changes in shape and/or cross-sectional area, and/or asymmetric cross-sectional shapes, molding stresses imparted on the molded material may be reduced. Reducing molding stresses imparted on the molded material may reduce birefringence caused by residual stress present in the molded component after the molding process is complete. By utilizing a mold designed to reduce stress on the molded material during molding, birefringence in the molded component may be reduced or substantially eliminated.

In some examples, the mold cavity may define a shape other than the shape of the optical component to be formed. The molded component then may be machined to form an optical component having a final shape. By machining the molded component, one or more acute angles, asymmetric cross-sectional shapes, and/or changes in shape and/or cross-sectional area may be formed in the optical component, while reducing residual stress in the optical component compared to an optical component molded directly in the final shape.

In one example, the disclosure describes a method that includes injection molding an optical material in a mold defining at least one optical surface to form a molded component, and machining the molded component to form a machined optical component including a machined optical surface.

In another example, the disclosure describes a method may include injection molding an optical material in an axially symmetric mold cavity defining at least one optical surface to form a molded component, and machining the molded component to form an optical component that does not possess axial symmetry.

In another example, the disclosure describes optical component formed by any of the methods described herein.

The details of one or more examples are set forth in the accompanying drawings and the description below. Other features, objects, and advantages will be apparent from the description and drawings, and from the claims.

DETAILED DESCRIPTION

The disclosure describes optical components, molds for forming optical components, and techniques for forming optical components. In some examples, the optical components may be formed of a low birefringence material, such as a low birefringence polymer, and the mold may define a mold cavity selected to reduce molding stresses imparted on the low birefringence material during the molding process. For example, rather than the mold defining a cavity with acute angles, sudden changes in shape or cross-sectional area, or asymmetric cross-sectional shapes, the mold may define a cavity with a relatively simple shape, such as a rectangular cuboid or a cylinder. By reducing a number of acute angles, sudden changes in shape and/or cross-sectional area, and/or asymmetric cross-sectional shapes, molding stresses imparted on the low birefringence material may be reduced. Reducing molding stresses imparted on the low birefringence material may reduce birefringence caused by residual stress present in the molded component after the molding process is complete. By utilizing a low birefringence material and a mold designed to reduce stress on the low birefringence material during molding, birefringence in the molded component may be reduced or substantially eliminated.

In some examples, the mold cavity may define a shape other than the shape of the optical component to be formed. The mold cavity shape may be selected to reduce stress on the low birefringence material during molding. The molded component then may be sawed, milled, or otherwise machined to form a machined optical component. By sawing, milling, or otherwise machining the molded component, one or more acute angles, asymmetric cross-sectional shapes, and/or changes in shape and/or cross-sectional area may be formed in the machined optical component.

In some examples, the machined optical component may include at least one molded optical surface that is defined by a wall of the mold, and at least one machined optical surface that is defined by the machining of the molded component. In some examples, the at least one machined optical surface may be an optical surface which, in use, is disposed adjacent to a material having a relatively similar index of refraction, (e.g., a refractive index within about 20% of the refractive index of the machined optical component, such as within about 5% or within about 2%), as the machined optical surface may have a surface roughness that could result in undesired scattering when disposed adjacent to a material having a relatively different index of refraction.

In some examples, the molds and techniques described herein may facilitate forming of optical components having relatively low birefringence. Additionally or alternatively, the molds and techniques described herein may facilitate forming optical components from polymers that may exhibit undesirable birefringence when molded in molds having acute angles, sudden changes in shape and/or cross-sectional area, and/or asymmetric cross-sectional shapes. In some examples, the molds and techniques described herein may facilitate economical formation of optical components, e.g., with higher throughput than using molds defining the final shape of the optical component to be molded.

Figure 1:
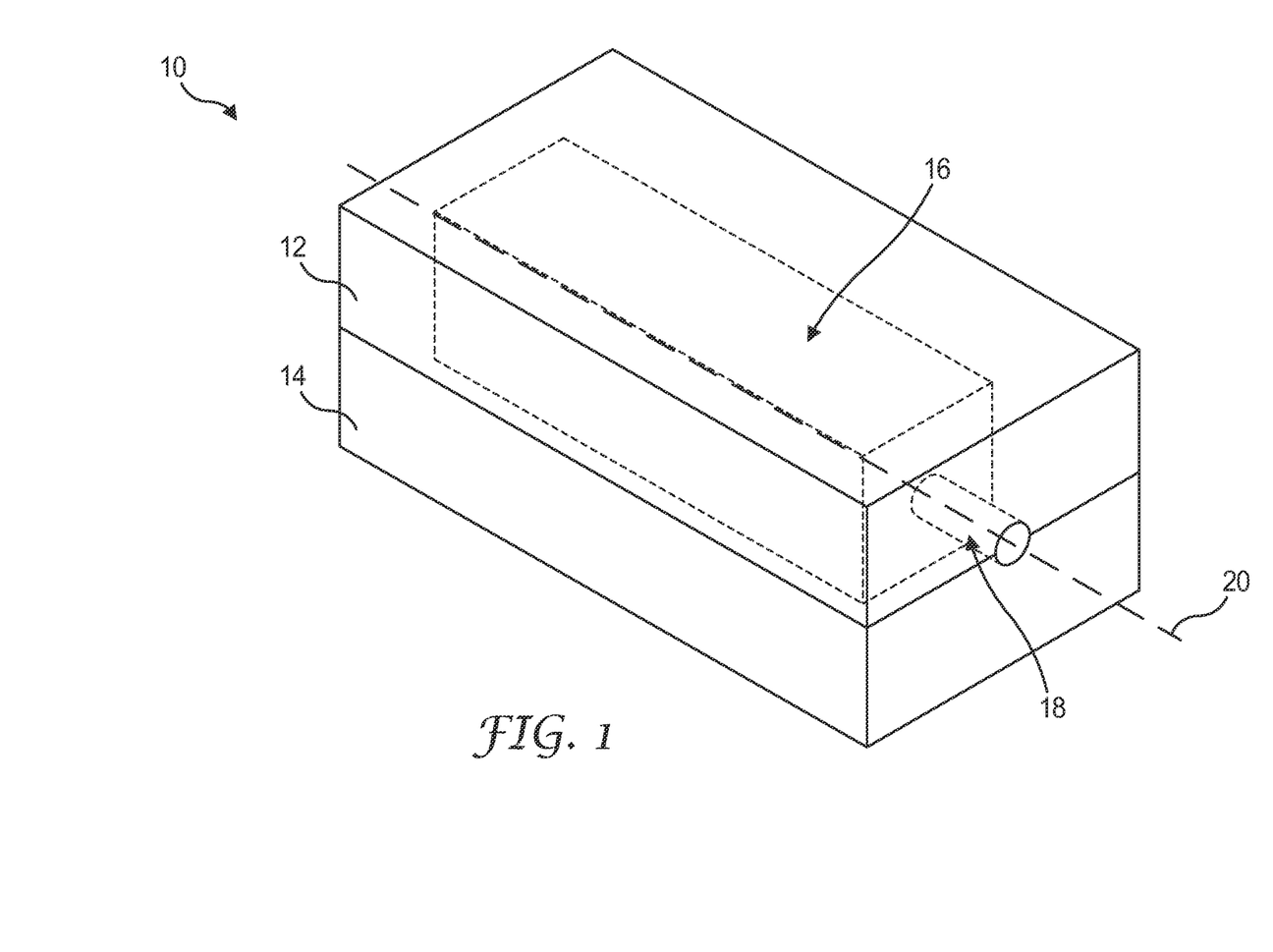
FIG. 1 is a conceptual diagram illustrating an example mold for forming a molded component.

FIG. 1 is a conceptual diagram illustrating an example mold for forming a molded component. Mold 10 includes a first mold portion 12 and a second mold portion 14. Together, first and second mold portions 12 and 14 define a mold cavity 16, which defines the shape of the component to be molded. First and second mold portions 12 and 14 also define a gate region 18, through which material enters into mold cavity 16 during the molding process.

Although mold 10 in the illustrated example defines a single mold cavity 16, in other examples, mold 10 may define a plurality of mold cavities. In some examples, each of the plurality of mold cavities may define a substantially identical (e.g., identical or nearly identical aside from manufacturing tolerances) shapes and/or sized. In other examples, at least one cavity may have a different shape than the other cavities.

In some examples, mold cavity 16 may include a shape that has relatively small changes in cross sectional area and/or shape in planes substantially normal to long axis 20. For example, the cross sectional area of mold cavity 16 may change by less than about 50% along at least about 50% of the flow length (e.g., long axis 20). As another examples, the cross sectional area of mold cavity 16 may change by less than about 25% along at least about 50% of the flow length (e.g., long axis 20). Additionally or alternatively, as shown in FIG. 1, mold cavity 16 may have a large aspect ratio, determined as the ratio of the length of mold cavity 16 measured a direction parallel to long axis 20 compared to the width of mold cavity 16 measured in a direction perpendicular to long axis 20. For example, the aspect ratio may be greater than about 2.5:1 (length:width). In some examples, as shown in FIG. 1, mold 10 defines a mold cavity 16 that includes no acute angles. As used herein, an acute angle may include an angle between about 10° and about 80°. Although the example depicted in FIG. 1 include both a large aspect ratio and relatively small changes in cross sectional area and/or shape in planes substantially normal to long axis 20, in other examples, a mold cavity 16 may include a large aspect ratio or relatively small changes in cross sectional area and/or shape in planes substantially normal to long axis 20.

In the example illustrated in FIG. 1, mold 10 defines mold cavity 16 with a generally rectangular cuboid shape. In other examples, mold 10 may define mold cavity 16 with a different shape, such as a cylinder, sphere, or another, more complex shape, such as a generally rectangular cuboid shape with one or more curved surfaces (e.g., spherical, elliptical, or other curvature).

Figure 2:
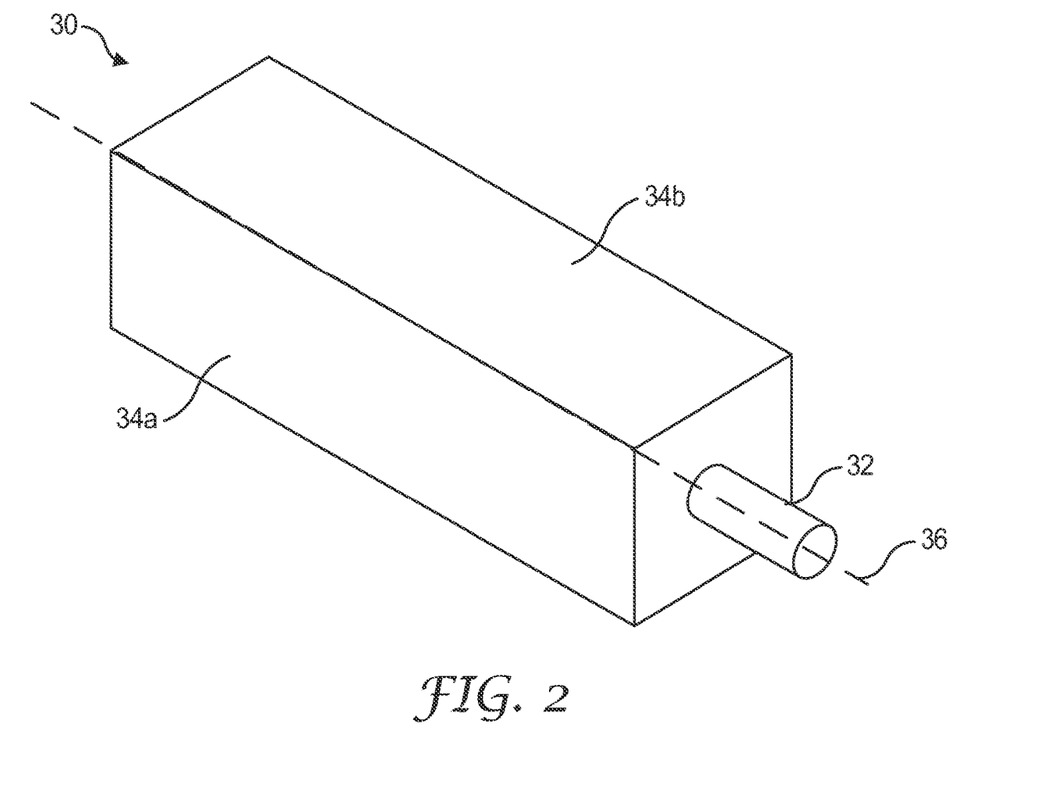
FIG. 2 is a conceptual diagram illustrating an example molded component formed using the example mold illustrated in FIG. 1.

The walls of mold 10 defining mold cavity 16 define surfaces of the component molded within mold cavity 16 (e.g., molded component 30 illustrated in FIG. 2). In some examples, at least one of the surfaces of the component may be an optical surface. As used herein, an optical surface refers to a surface of a component through which light is transmitted or at which light is reflected, either by total internal reflection or by a coating. Because of this, in some examples, the walls of mold 10 defining mold cavity 16 may be formed using, for example, single point diamond machining and/or polishing to define a surface with low surface roughness.

FIG. 2 is a conceptual diagram illustrating an example molded component formed using mold 10 illustrated in FIG. 1. As shown in FIG. 2, molded component 30 defines a shape that is the negative of mold cavity 16. Molded component 30 defines a shape generally corresponding to the negative of mold cavity 16. In the example of FIGS. 1 and 2, mold cavity 16 defines a generally rectangular cuboid shape, with gate region 18 appended to one end, and molded component 30 thus defines a generally rectangular cuboid shape, with a cylinder 32 appended to one end at a location corresponding to gate region 18.

Molded component 30 includes a plurality of surfaces defined by mold 10, a first surface 34a and a second surface 34b (collectively, "surfaces 34") of which are labeled in FIG. 2. In some examples, one or more of surfaces 34 may be an optical surface, through which light is transmitted or at which light is reflected, either by total internal reflection or by a coating, during use of molded component 30 or a portion of molded component 30 in an optical device or system. Because of this, a low surface roughness may be desired, and, as described above, the walls of mold 10 that define mold cavity 16 (or at least those walls that define optical surfaces of molded component 30) may be formed using, for example, single point diamond machining and/or polishing.

Forming molded component 30 imparts stresses on molded component 30. In some examples, stresses may be produced during injection of material from which molded component 30 is formed into mold cavity 16, e.g., due to flow of the material into mold cavity 16 under pressure. In some examples, stresses may be produced during solidification and cooling of the material, e.g., due to different portions of molded component 30 solidifying and/or cooling at different rates. In some examples, stresses also may be produced during ejection of molded component 30 from mold 10.

The shape and aspect ratio of mold cavity 16, and, thus, molded component 30, may affect the stresses imparted to molded component 30. For example, a mold cavity 16 that has a large aspect ratio may impart lower stress to the material from which molded component 30 is formed than a mold cavity that has a small aspect ratio, e.g., during injection and/or cooling. Similarly, a mold cavity 16 that defines a relatively constant cross-sectional area and/or shape may impart lower stress to the material from which molded component 30 is formed than a mold cavity that has a non-constant cross-sectional area and/or shape, e.g., during injection and/or cooling. In some examples, the lower stresses imparted to molded component 30 may be due to more symmetrical material flow and/or cooling.

By reducing stress imparted to molded component 30 during molding, residual stress within molded component 30 may be reduced. Because residual stress within molded component 30 may produce birefringence, reducing residual stress may reduce birefringence compared to a molded component with higher levels of residual stress. In this way, mold 10 defining mold cavity 16 and the techniques described herein may produce optical components that produce lower birefringence that optical components produced using the same material and other mold geometries.

In some examples, the shape of mold cavity 16 selected for reducing residual stress in molded component 30 may not be the same as the desired shape of an optical component. In some examples, the molded component 30 may be machined to form an optical component with a different shape than the shape of molded component 30. Additionally or alternatively, more than one optical component (e.g., a plurality of optical components) may be formed from molded component 30 by machining molded component 30. FIGS. 3-9 are flow diagrams and conceptual diagrams illustrating examples of techniques that include injection molding, machining, and, optionally, other processes, to form at least one optical component and optical components formed using injection molding, machining, and, optionally, other processes.

Figure 3:
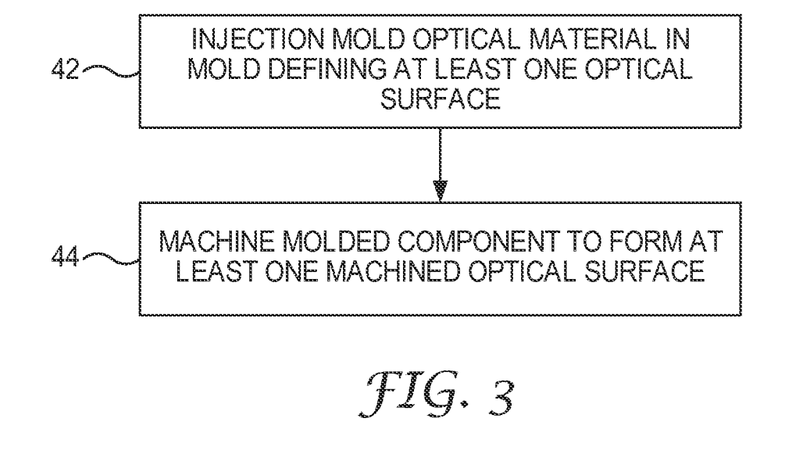
FIG. 3 is a flow diagram illustrating an example technique for forming an optical component using injection molding and machining.

FIG. 3 is a flow diagram illustrating an example technique for forming an optical component using injection molding and machining. The technique of FIG. 3 will be described with reference to the conceptual diagrams of FIGS. 1, 2, and 4, although, in other examples, the technique of FIG. 3 may be used with other mold geometries to make other molded components, and/or may be used to make optical components with a different shape than that illustrated in FIG. 4.

The technique of FIG. 3 includes injection molding an optical material in a mold 10 defining at least one optical surface (42). Injection molding may be performed by introducing the material to be molded in molten form under pressure through gate region 18 of mold 10. In some examples, the optical material includes a relatively low birefringence polymeric material including, for example, an acrylic, such as poly(methyl methacrylate), a cyclo-olefin thermoplastic resin, or the like. Example polymeric materials include those available under the trade designation ZEONEX® K26R, from ZEON CORPORATION, Tokyo, Japan; a cyclo-olefin thermoplastic resin available under the trade designation ZEONEX® E48R, from ZEON CORPORATION; or a cyclic-olefin copolymer available under the trade designation APEL™ APL5014DP from Mitsui Chemicals America, Inc., Rye Brook, N.Y.

As the molten material flows into mold cavity 16 through gate region 18, the molten material experiences stress due to the flow. Higher levels of stress may occur near regions where the mold changes shape, such as the region of mold cavity 16 adjacent to gate region 18, or at corners of mold cavity 16. Additionally, stresses may be greater when the change in shape is more sudden or where the corners are sharper (e.g., acute). By maintaining a substantially similar cross-sectional shape and/or area in planes substantially normal to long axis 20 and including few or no acute angles (e.g., angles between about 10° and about 80°), flow stresses may be reduced.

Once mold cavity 16 is substantially filled with material at a desired pressure, mold 10 and molded component 30 (disposed in mold cavity 16) may be cooled to solidify the molten material and form molded component 30. Cooling also may introduce stress within molded component 30, e.g., due to differential cooling rates of different portions of molded component 30. In some example, greater symmetry of mold cavity 16 and molded component 30 may reduce cooling stresses, e.g., due to a more uniform cooling rate of molded component 30. After cooling and solidifying of molded component 30, molded component 30 may be ejected from mold 10. As described above, at least one of surfaces 34 may be an optical surface, through which light is transmitted or at which light is reflected, either by total internal reflection or by a coating, during use of the optical component formed from at least a portion of molded component 30.

The technique of FIG. 3 also includes machining molded component 30 to form at least one machined optical surface (44). Machining molded component 30 may include, for example, cutting, milling, polishing, or the like. In some examples, machining molded component 30 includes single point diamond fly cutting, multi point diamond fly cutting, rough cutting followed by fine cutting, cutting followed by polishing, or the like. In some examples, machining molded component 30 may include removing cylinder 32.

Figure 4:
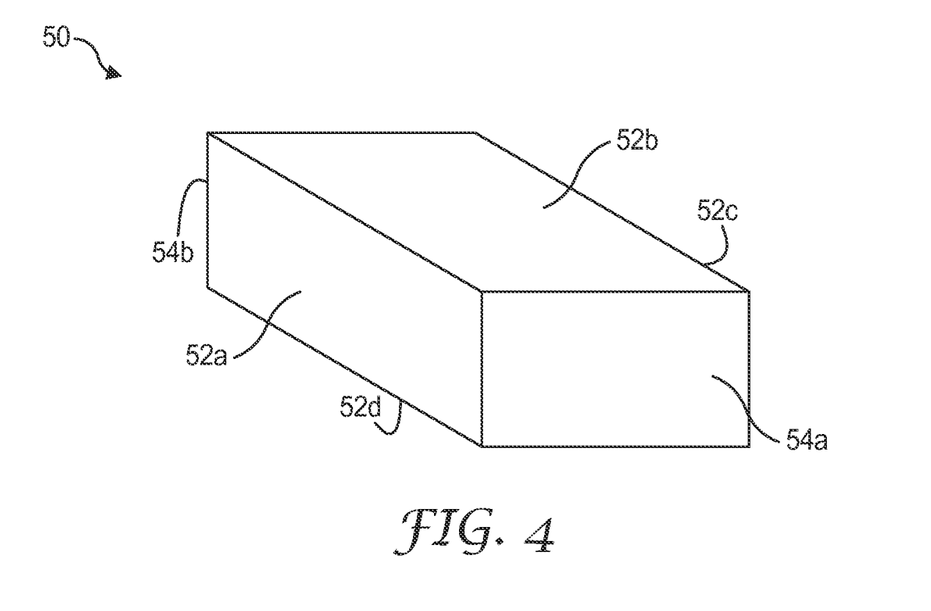
FIG. 4 is a conceptual diagram illustrating an example optical component including at least one machined optical surface.

FIG. 4 is a conceptual diagram illustrating an example optical component 50 including at least one machined optical surface. In the example illustrated in FIG. 4, optical component 50 includes a first machined surface 54a and a second machined surface 54b (collectively, "machined optical surfaces 54"). Optical component 50 also includes a first molded surface 52a, a second molded surface 52b, a third molded surface 52c, and a fourth molded surface 52d (collectively, "molded surfaces 52"). Molded surfaces 52 are defined by the walls of mold cavity 16. In some examples, at least one of molded surface 52 may be a molded optical surface, e.g., a surface through which light is transmitted or at which light is reflected, either by total internal reflection or by a coating, during use of optical component 50.

At least one of machined surfaces 54 may be a machined optical surface, e.g., a surface through which light is transmitted or at which light is reflected, either by total internal reflection or by a coating, during use of optical component 50. In this way, optical component 50 may have a different shape than molded component 30, and at least one of the optical surfaces may be defined be a machined surface. This may provide flexibility in forming optical component 50 with a desired shape while reducing or substantially eliminating (e.g., eliminating or nearly eliminating) birefringence within optical component 50.

The at least one machined optical surface may include a relatively low surface roughness. However, in some examples, the surface roughness of the at least one machined optical surface may be greater than the surface roughness of the at least one molded optical surface. Because of this, in some examples, the at least one machined optical surface may be used as a surface disposed adjacent to a material having a refractive index that is substantially similar to the refractive index of optical component 50. For example, the refractive index of the material adjacent to the at least one machined optical surface may be within about 20% of the refractive index of optical component 50, such as within about 5% of the refractive index of optical component 50 or within about 2% of the refractive index of optical component 50. In some examples, having the refractive indices of the material adjacent to the at least one machined optical surface and optical component be substantially similar may reduce distortion due to scattering of light caused by surface roughness of the at least one molded optical surface.

Figure 5:
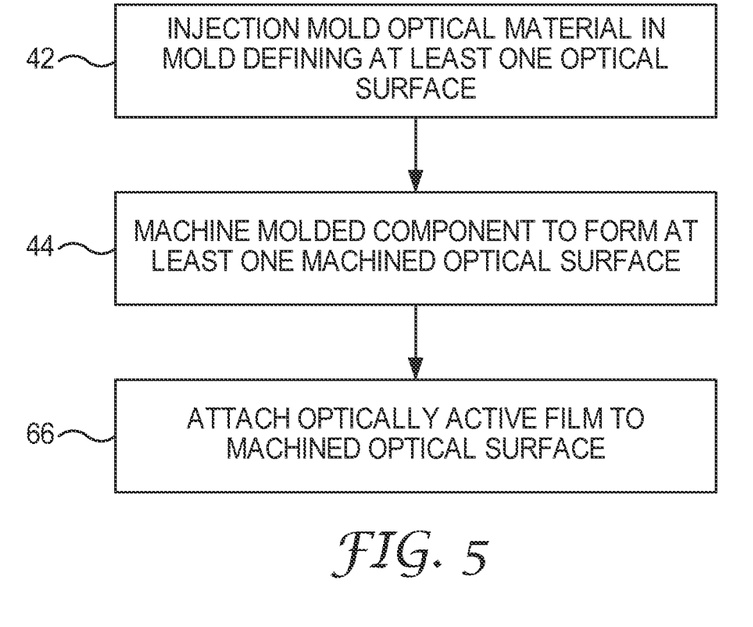
FIG. 5 is a flow diagram illustrating another example technique for forming an optical component using injection molding and machining.
Figure 6:
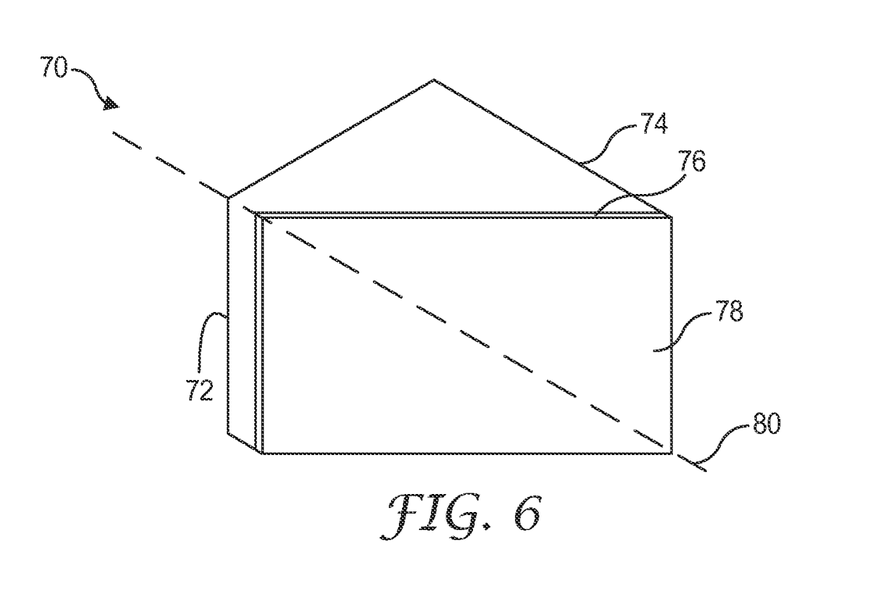
FIG. 6 is a conceptual diagram illustrating an example optical component including an optically active film attached to a machined optical surface.

FIG. 5 is a flow diagram illustrating another example technique for forming an optical component using injection molding and machining. The technique of FIG. 5 will be described with reference to the conceptual diagrams of FIGS. 1, 2, and 6, although, in other examples, the technique of FIG. 5 may be used with other mold geometries to make other molded components, and/or may be used to make optical components with a different shape than that illustrated in FIG. 6. FIG. 6 is a conceptual diagram illustrating an example optical component including an optically active film attached to a machined optical surface.

Similar to the technique illustrated in FIG. 3, the technique of FIG. 5 includes injection molding an optical material in a mold 10 defining at least one optical surface (42) and machining molded component 30 to form at least one machined optical surface (44). Rather than forming a three-dimensional parallelogram, as is illustrated in FIG. 4, optical component 70 is a modified prism. Optical component 70 does not possess axial symmetry, e.g., when defined with respect to axis 80 illustrated in FIG. 6. Axis 80 passes through a midpoint of first surface 72 of optical component 70. In some examples, axis 80 may be substantially parallel to a long axis of the molded component (e.g., molded component 30 of FIG. 2), and optical component 70 may be formed by machining molded component 30. In this way, an optical component 70 that does not possess axial symmetry with respect to axis 80 may be formed from a molded component 30 that does possess axial symmetry. As described above, axial symmetry of molded component 30 may reduce or substantially eliminate residual stresses in molded component 30, which may reduce or substantially eliminate birefringence in optical components formed from molded component 30, e.g., optical component 70.

In some examples, first surface 72 may be a machined surface. In other examples, first surface 72 may be a molded surface. In some examples, first surface 72 is an optical surface, e.g., a surface through which light is transmitted or at which light is reflected, either by total internal reflection or by a coating, during use of optical component 70. In other examples, first surface 72 is not an optical surface. First surface 72 may be substantially planar (e.g., planar or nearly planar) in some examples, or may include curvature in at least one dimension (e.g., elliptical, spherical, or more complex curvature).

Optical component 70 also includes a second surface 74. In some examples, second surface 74 may be a machined surface. In other examples, second surface 74 may be a molded surface. In the example illustrated in FIG. 6, second surface 74 is oriented substantially perpendicular to first surface 72. In some examples, second surface 74 is an optical surface, e.g., a surface through which light is transmitted or at which light is reflected, either by total internal reflection or by a coating, during use of optical component 70. In other examples, second surface 74 is not an optical surface. Second surface 74 may be substantially planar (e.g., planar or nearly planar) in some examples, or may include curvature in at least one dimension (e.g., elliptical, spherical, or more complex curvature).

Optical component 70 also includes a third surface 76. Third surface 76 may be a machined surface. In the example illustrated in FIG. 6, third surface 76 defines an acute interior angle (e.g., an interior angle between about 10° and about 80°) with second surface 74. Third surface 76 may be an optical surface, e.g., a surface through which light is transmitted or at which light is reflected, either by total internal reflection or by a coating, during use of optical component 70.

Unlike the technique illustrated in FIG. 3, the technique of FIG. 5 also includes attaching an optically active film 78 to third surface 76 (66). In some examples, optically active film 78 may be attached to third surface 76 using adhesive or optical cement. Example optical adhesives or cements include UV curable optical adhesives or cements, thermally curable optical adhesives or cements, pressure sensitive optical adhesives, and the like. Some examples include optically clear adhesives available from 3M™ Co., Saint Paul, Minn.

The optical adhesive may be selected so that the refractive index of the material from which the body of optical component 70 is formed and the refractive index the optical adhesive are relatively closely matched. In some examples, relatively closely matched may mean the same or substantially similar. For example, the difference between the refractive index of the material from which the body of optical component 70 is formed and the refractive index the optical adhesive may be less than about 20%, or less than about 5%, or less than about 2%. A relatively close match between the refractive index of the material from which the body of optical component 70 is formed and the refractive index the optical adhesive may reduce scattering at the interface of the body of optical component and the adhesive due to surface roughness of third surface 76.

Optically active film 78 may include one or more layers of optically active material, such as an optically retarding layer, a circular polarizer layer, a reflective layer, an optically absorptive layer, or the like. The optically active film 78 may be selected to provide the desired optical effect at third surface 76.

Although optical component 70 includes a single optically active film 78 attached to a single surface (third surface 76), in other examples, optical component may include more than one optically active film 78, which may be attached to a single surface or to multiple surfaces of optical component 70. For example, a single type of optically active film 78 may be attached to multiple surfaces of optical component 70, or a different type of optically active film 78 may be attached to a first surface (e.g., first surface 72) of optical component 70 than the type of optically active film 78 attached to a second surface (e.g., second surface 74) of optical component 70. Similarly, the same optical adhesive or different optical adhesives may be used to attach respective optically active films 78 to different surfaces of optical component 70.

The technique illustrated in FIG. 5 may provide flexibility in forming optical component 70 with a desired shape while reducing or substantially eliminating (e.g., eliminating or nearly eliminating) birefringence within optical component 70. For example, second surface 74 and third surface 76 define an acute interior angle (e.g., an interior angle between about 10° and about 80°). In examples in which optical component 70 is molded in a mold defining the shape of optical component 70, residual stress may be present near the vertex between second surface 74 and third surface 76, which may produce birefringence at this location. However, by forming molded component 30, which does not include acute interior angles and then machining optical component 30 to form optical component 70, residual stress near the vertex between second surface 74 and third surface 76 may be reduced, which may reduce birefringence at this location of optical component. Additionally or alternatively, using an optical adhesive or cement to attach optically active film 78 to third surface 76 may mitigate surface scattering due to surface roughness caused by machining third surface 76.

In some examples, the techniques described herein may include forming a plurality of optical components from a molded component, such as molded component 30 (FIG. 2). The molded component 30 may define a shape that allows the plurality of optical components to be formed by machining molded component 30. In some examples, this may allow formation of multiple optical parts with non-axially symmetric shapes from a molded component that is axially symmetric about at least one axis. As described above, they may produce optical components with lower residual stress than components with similar shapes that were directly molded with the shape. This may reduce birefringence of the optical components.

Figure 7:
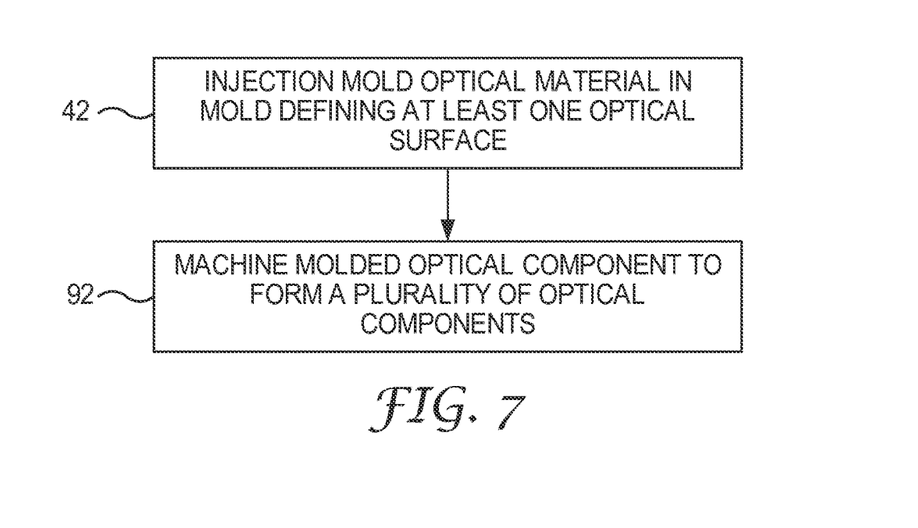
FIG. 7 is a flow diagram illustrating an example technique for forming a plurality of optical components using injection molding and machining.
Figure 8:
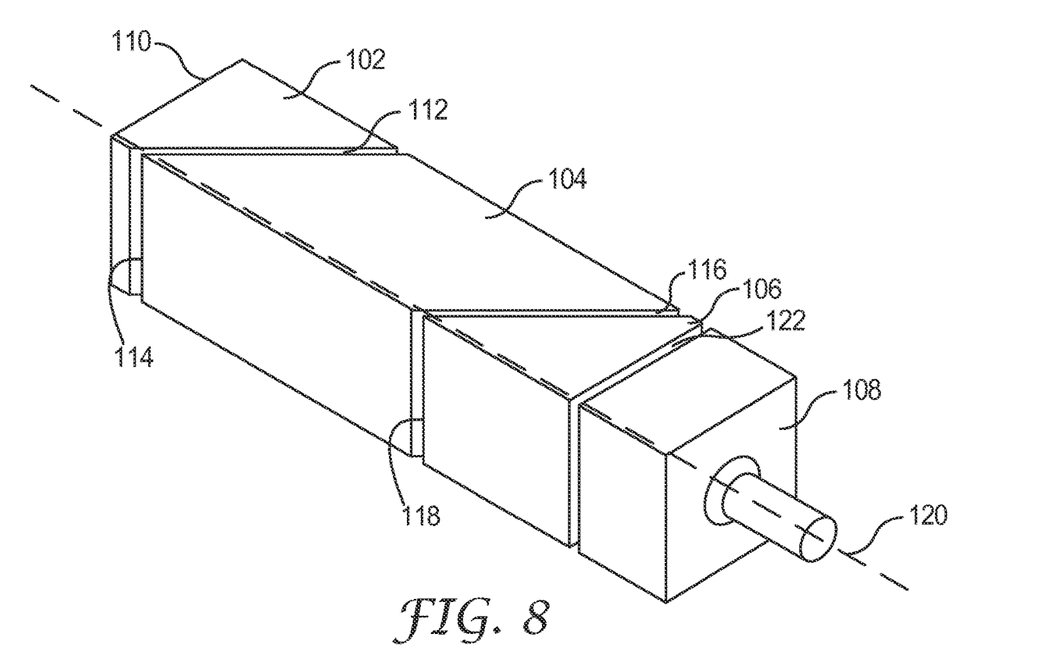
FIG. 8 is a conceptual diagram illustrating an example of a plurality of optical components formed by machining a molded component.

FIG. 7 is a flow diagram illustrating an example technique for forming a plurality of optical components using injection molding and machining. The technique of FIG. 7 will be described with reference to the conceptual diagrams of FIGS. 1, 2, and 8, although, in other examples, the technique of FIG. 7 may be used with other mold geometries to make other molded components, and/or may be used to make optical components with a different shape than that illustrated in FIG. 8. FIG. 8 is a conceptual diagram illustrating an example of a plurality of optical components formed by machining a molded component.

Similar to the techniques illustrated in FIGS. 3 and 5, the technique illustrated in FIG. 7 includes injection molding an optical material in a mold 10 defining at least one optical surface to form a molded component 30 (42). The technique of FIG. 7 further includes machining molded component 30 to form a plurality of optical components (92).

FIG. 8 illustrates an example of a plurality of optical components that may be formed by machining molded component 30. The plurality of optical components illustrated in FIG. 8 includes first optical component 102, second optical component 104, and third optical component 106. A gate component 108 is also formed by machining molded component 30 in the example of FIG. 8. In the example of FIG. 8, gate component 108 may not be an optical component and may instead be a waste component.

In some examples, as shown in FIG. 8, first optical component 102 and third optical component 106 are prisms, and second optical component 104 is a three-dimensional parallelogram. Although molded component 30 is axially symmetric about long axis 36 (FIG. 2), first optical component 102, second optical component 104, and third optical component 106 are not axially symmetric about long axis 120 (FIG. 8).

First optical component 102 may be formed by machining molded component 30 to form machined surface 112 of first optical component 102 and machined surface 114 of second optical component 104. Any of the machining techniques described herein may be used to form machined surface 112 of first optical component 102 and machined surface 114 of second optical component 104. In some examples, surface 110 of first optical component 102 may be machined, while in other examples, surface 110 may be molded.

Second optical component 104 may be formed by machining molded component 30 to form machined surface 112 of first optical component 102 and machined surface 114 of second optical component 104, and by machining molded component 30 to form machined surface 116 of second optical component 104 and machined surface 118 of third optical component 106. In some examples, at least one of the other surfaces of second optical component 104 may be machined, while in other examples, at least one of the other surfaces of second optical component 104 may be molded.

Third optical component may be formed by machining molded component 30 to form machined surface 116 of second optical component 104 and machined surface 118 of third optical component 106, and by machining molded component 30 to form machined surface 122 of third optical component 106. In some examples, at least one of the other surfaces of third optical component 106 may be machined, while in other examples, at least one of the other surfaces of third optical component 106 may be molded.

Figure 9:
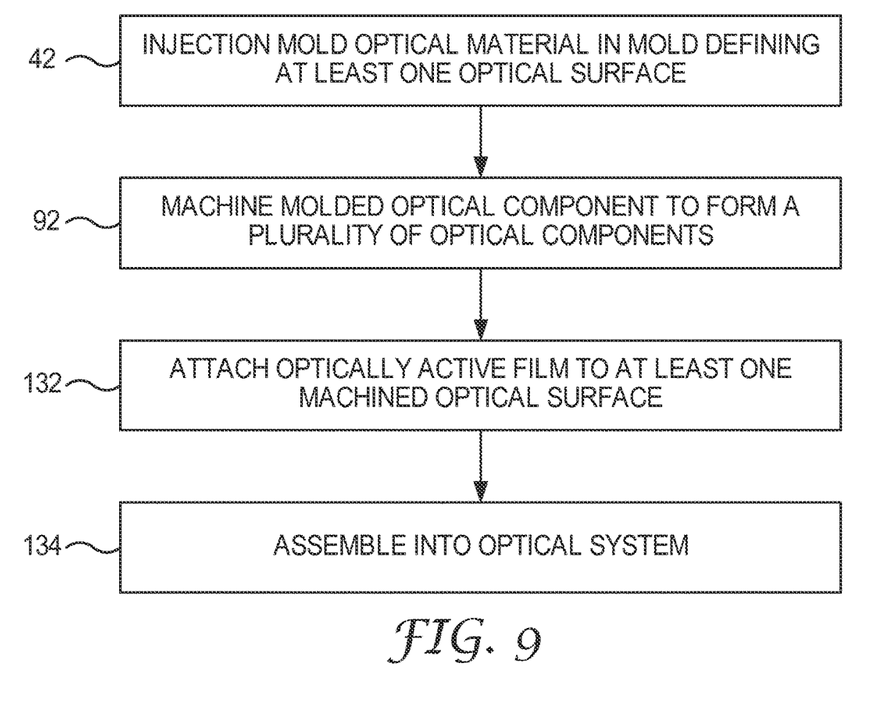
FIG. 9 is a flow diagram illustrating an example technique for forming an optical system using injection molding, machining, and assembling using optical adhesives.
Figure 10:
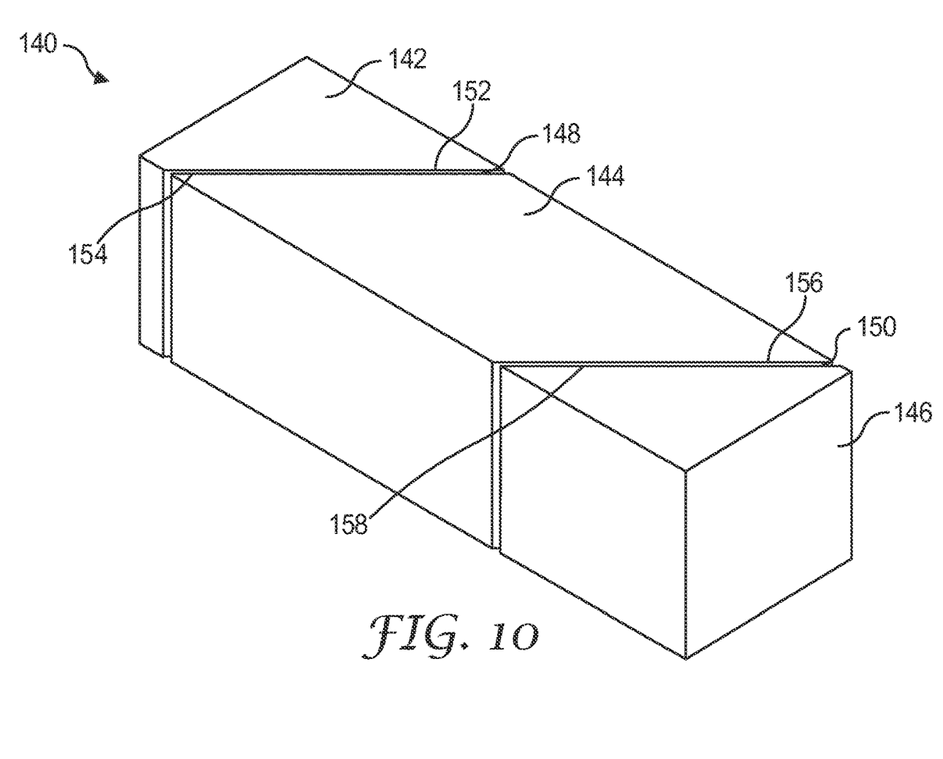
FIG. 10 is a conceptual diagram illustrating an example of an optical system formed using injection molding, machining, and assembling using optical adhesives.

In some examples, one or more of first optical component 102, second optical component 104, and third optical component 106 may subsequently be used as part of an optical system. For example, the optical components 102, 104, and 106 may be formed as illustrated in FIGS. 7 and 8, processed in one or more ways (e.g., by attaching an optically active film to one or more surfaces of at least one of the optical components 102, 104, and 106), and reassembled with similarly shaped optical components. FIG. 9 is a flow diagram illustrating an example technique for forming an optical system using injection molding, machining, and assembling using optical adhesives. FIG. 10 is a conceptual diagram illustrating an example of an optical system 140 formed using injection molding, machining, and assembling using optical adhesives.

Similar to the technique illustrated in FIG. 7, the technique illustrated in FIG. 9 includes injection molding an optical material in a mold 10 defining at least one optical surface to form a molded component 30 (42), and machining molded component 30 to form a plurality of optical components (92). Additionally, the technique of FIG. 9 includes attaching an optically active film to at least one machined optical surface (132). For example, a first optically active film 148 may be attached to at least one of machined optical surface 152 of first optical component 142 or machined optical surface 154 of second optical component 144. As another example, a second optically active film 150 may be attached to at least one of machined optical surface 156 of second optical component 144 or machined optical surface 158 of third optical component 146. Optically active films 148 and 150 may be attached to predetermined surfaces using an optical adhesive or cement, as described above with respect to FIGS. 5 and 6. Example optical adhesives or cements include UV curable optical adhesives or cements, thermally curable optical adhesives or cements, pressure sensitive optical adhesives, and the like.

Each of optically active films 148 and 150 may include one or more layers of optically active material, such as an optically retarding layer, a circular polarizer layer, a reflective layer, an optically absorptive layer, or the like. The respective ones of optically active films 148 and 150 may be selected to provide the desired optical effect at the interface of machined optical surfaces 152 and 154, and machined optical surfaces 156 and 158, respectively. For example, optical system 140 may be a polarizing beam splitter, and each of optically active films 148 and 150 may include a reflective polarizing film.

The technique of FIG. 9 also includes assembling optical components 142, 144, and 146 into optical system 140 (134). In some examples, optical components 142, 144, and 146 may be assembled into optical system 140 (134) by adhering optically active films 148 and 150 to the other surfaces to which optically active films 148 and 150 were not attached during step (132). For example, if first optically active film 148 was attached to machined optical surface 152 of first optical component 142 during step (132), first optically active film 148 may be attached to machined optical surface 154 of second optical component 144 during step (134). Conversely, if first optically active film 148 was attached to machined optical surface 154 of second optical component 144 during step (132), first optically active film 148 may be attached to machined optical surface 152 of first optical component 142 during step (134).

Similarly, if second optically active film 150 was attached to machined optical surface 156 of second optical component 144 during step (132), second optically active film 150 may be attached to machined optical surface 158 of third optical component 146 during step (134). Conversely, if second optically active film 150 was attached to machined optical surface 158 of third optical component 146 during step (132), second optically active film 150 may be attached to machined optical surface 156 of second optical component 144 during step (134). Regardless of the order in which first and second optically active films 148 and 150 are attached to predetermined surfaces optical components 142, 144, and 146, an optical adhesive or cement may be used to attach first and second optically active films 148 and 150 are attached to the predetermined surfaces optical components 142, 144, and 146.

In some examples, optical components 142, 144, and 146 may derive from different molded components. For example, first optical component 142 may be machined from a first molded component, second optical component 144 may be machined from a second molded component, and third optical component 146 may be machined from a third molded component. In some examples, the first, second, and third molded components are formed using the same mold, so the first, second, and third molded components may be substantially identical in shape and size. Hence, in some examples, a first optical component 142 formed from the first molded component may be substantially identical in shape and size to a first optical component 142 formed from the second molded component. In this way, optical system 140 may be formed from first, second, and third optical components 142, 144, and 146 derived from different molded components. In this way an optical system 140 including multiple, more complex components may be formed from a single molded component 30 or from a plurality of interchangeable (e.g., equivalent) molded components.

Various examples have been described. These and other examples are within the scope of the following claims.

The invention claimed is:

1. A method comprising:
   injection molding an optical material in a mold defining a mold cavity that does not include any acute angles and comprising at least one optical surface to form a molded component comprising at least one molded optical surface; and
   machining the molded component to form a machined optical component including a machined optical surface forming an acute interior angle with a molded optical surface in the at least one molded optical surface in the machined optical component.

2. The method of claim 1, further comprising adhering an optically active film to the machined optical surface using an optical adhesive.

3. The method of claim 2, wherein a refractive index of the optical adhesive is within about 20% of the refractive index of the optical material.

4. The method of claim 2, wherein a refractive index of the optical adhesive is within about 5% of the refractive index of the optical material.

5. The method of claim 2, wherein the molded component is axially symmetric about a long axis of the molded component, and wherein the machined optical component is not axially symmetric about the long axis.

6. The method of claim 2, wherein the mold defines a mold cavity that is axially symmetric about a long axis of the mold cavity, and wherein the molded component possesses axial symmetry about a long axis of the molded component.

7. The method of claim 2, wherein the mold defines a mold cavity that defines an aspect ratio of greater than about 2.5:1, wherein the aspect ratio is defined as a ratio of the length of the mold cavity measured a direction parallel to a long axis of the mold cavity compared to the width of the mold cavity measured in a direction perpendicular to the long axis of the mold cavity.

8. The method of claim 2, wherein the mold defines a mold cavity having a rectangular cuboid shape.

9. The method of claim 2, wherein machining the molded component to form the machined optical component including the machined optical surface comprises machining the molded component to form a plurality of machined optical components, wherein at least one machined optical component of the plurality of machined optical components includes a machined optical surface, and wherein at least one of the plurality of machined optical components does not include a gate region.

10. The method of claim 9, wherein each of the plurality of machined optical components includes a respective machined optical surface.

11. The method of claim 9, further comprising:
    attaching an optically active film to the machined optical surface of the at least one machined optical component using an optical adhesive;
    assembling the at least one machined optical component with at least one other optical component to form an optical system.

12. The method of claim 11, wherein the at least one other optical component comprises a second machined optical component from the plurality of machined optical components.

13. The method of claim 11, wherein assembling the at least one machined optical component with at least one other optical component to form an optical system comprises attaching the optically active film to a surface of the at least one other optical component using an optical adhesive.

14. The method of claim 2, wherein machining the molded component to form the machined optical component including the machined optical surface comprises diamond fly cutting the molded component to form the machined optical component including the machined optical surface.

15. The method of claim 2, wherein the optical material comprises at least one of an acrylic or a cyclo-olefin polymer.

16. The method of claim 1, wherein the machined optical surface and the at least one other optical surface are substantially planar surfaces.

17. The method of claim 6, wherein machining the molded component to form the machined optical component including the machined optical surface comprises cutting the molded component substantially along a plane making an acute angle with the long axis.

* * * * *